(12) United States Patent
Stave et al.

(10) Patent No.: US 12,512,179 B2
(45) Date of Patent: Dec. 30, 2025

(54) INTERPOSERS FOR MEMORY DEVICE TESTING AND CHARACTERIZATION, INCLUDING INTERPOSERS FOR TESTING AND CHARACTERIZING DECISION FEEDBACK EQUALIZATION CIRCUITRY OF DDR5 MEMORY DEVICES

(71) Applicant: Micron Technology, Inc., Boise, ID (US)

(72) Inventors: Eric J. Stave, Meridian, ID (US); Luis Nathan Perez Acosta, Boise, ID (US); Bryce A. Gardiner, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 347 days.

(21) Appl. No.: 18/109,830

(22) Filed: Feb. 14, 2023

(65) Prior Publication Data
US 2023/0386596 A1 Nov. 30, 2023

(51) Int. Cl.
| | | |
|---|---|---|
| G11C 29/14 | (2006.01) | |
| G11C 29/02 | (2006.01) | |
| G11C 29/12 | (2006.01) | |
| G11C 29/50 | (2006.01) | |
| G11C 29/56 | (2006.01) | |

(52) U.S. Cl.
CPC ...... *G11C 29/56016* (2013.01); *G11C 29/022* (2013.01); *G11C 29/1201* (2013.01); *G11C 29/50008* (2013.01); *G11C 29/14* (2013.01)

(58) Field of Classification Search
None
See application file for complete search history.

(56) References Cited

U.S. PATENT DOCUMENTS

| | | | |
|---|---|---|---|
| 12,142,332 B2 * | 11/2024 | Weng | G11C 29/56 |
| 2016/0172293 A1 * | 6/2016 | Shelsky | G01R 31/2818 174/260 |
| 2019/0287583 A1 * | 9/2019 | Hollis | G11C 7/1084 |
| 2019/0311960 A1 * | 10/2019 | Tan | G01R 31/2846 |
| 2020/0185049 A1 * | 6/2020 | Spirkl | H04L 1/0003 |

* cited by examiner

*Primary Examiner* — Jermele M Hollington
(74) *Attorney, Agent, or Firm* — Dorsey & Whitney LLP (57) ABSTRACT

Interposers for use in testing and characterizing memory devices, such as memory devices including decision feedback equalization circuitry, are disclosed herein. In one embodiment, an apparatus includes an interposer having a first interface couplable to a memory device, a second interface couplable to one or more testers, and a channel circuit between the first interface and the second interface. The channel circuit is configurable, via one or more resistive elements, to change a measurable value of a signal transmitted between the first interface and the second interface via the channel circuit.

20 Claims, 7 Drawing Sheets

INTERPOSERS FOR MEMORY DEVICE TESTING AND CHARACTERIZATION, INCLUDING INTERPOSERS FOR TESTING AND CHARACTERIZING DECISION FEEDBACK EQUALIZATION CIRCUITRY OF DDR5 MEMORY DEVICES

CROSS-REFERENCE TO RELATED APPLICATION(S)

The present application claims priority to U.S. Provisional Patent Application No. 63/347,483, filed May 31, 2022, the disclosure of which is incorporated herein by reference in its entirety.

TECHNICAL FIELD

The present disclosure is related to interposers for use in testing and characterizing memory devices, and associated systems, devices, and methods. For example, some embodiments of the present technology are directed to interposers for use in testing or characterizing decision feedback equalization (DFE) circuitry of memory devices, such as of double data rate fifth generation (DDR5) memory devices.

BACKGROUND

Memory devices are widely used to store information related to various electronic devices such as computers, wireless communication devices, cameras, digital displays, and the like. Memory devices are frequently provided as internal, semiconductor, integrated circuits and/or external removable devices in computers or other electronic devices. There are many different types of memory, including volatile and non-volatile memory. Volatile memory, including static random-access memory (SRAM), dynamic random-access memory (DRAM), and synchronous dynamic random-access memory (SDRAM), among others, may require a source of applied power to maintain its data. Non-volatile memory, by contrast, can retain its stored data even when not externally powered. Non-volatile memory is available in a wide variety of technologies, including flash memory (e.g., NAND and NOR) phase change memory (PCM), ferroelectric random-access memory (FeRAM), resistive random-access memory (RRAM), and magnetic random-access memory (MRAM), among others. Improving memory devices, generally, may include increasing memory cell density, increasing read/write speeds or otherwise reducing operational latency, increasing reliability, increasing data retention, reducing power consumption, or reducing manufacturing costs, among other metrics.

BRIEF DESCRIPTION OF THE DRAWINGS

Many aspects of the present disclosure can be better understood with reference to the following drawings. The components in the drawings are not necessarily to scale. Instead, emphasis is placed on illustrating clearly the principles of the present disclosure. The drawings should not be taken to limit the disclosure to the specific embodiments depicted, but are for explanation and understanding only.

DETAILED DESCRIPTION

The technology disclosed herein relates to interposers for use in testing and characterizing memory devices, and associated systems, devices, and methods. In the illustrated embodiments below, interposers of the present technology are primarily described in the context of testing or characterizing DFE circuitry of DDR5 DRAM memory devices. Interposers configured in accordance with various embodiments of the present technology, however, can be used to test or characterize circuitry other than DFE circuitry on DDR5 DRAM memory devices, including circuitry on other types of memory devices and systems (e.g., DDR, DDR2, DDR3, DDR4) and/or on memory devices and systems incorporating other types of storage media (e.g., PCM, SRAM, FRAM, RRAM, MRAM, read only memory (ROM), erasable programmable ROM (EPROM), electrically erasable programmable ROM (EEROM), ferroelectric, magnetoresistive, and/or non-volatile, flash (e.g., NAND and/or NOR) storage media). Additionally, or alternatively, interposers of the present technology can be used to test devices or systems other than memory devices, such as memory controllers, central processor units, or serializer-deserializer (SERDES) links (e.g., SERDES controllers). A person skilled in the art will understand that the technology may have additional embodiments and that the technology may be practiced without several of the details of the embodiments described below with reference to FIGS. 1-7.

Memory devices are commonly tested for quality of service, reliability, and/or calibration purposes using test and characterization fixtures before the memory devices are integrated into memory systems. These test and characterization fixtures often include channels designed for optimal signal integrity so that, when a memory device is operably connected to a tester via a channel of a test and characterization fixture, the tester can test or characterize the memory device without concern that any test or characterization results observed occurred as a result of properties of the channel as opposed to properties of the memory device. But such channel conditions are ideal—they are often not reflective of typical channel conditions that are present when a memory device is integrated into a memory system. As such, many test and characterization fixtures are ill-equipped to adequately test or characterize a memory device's operation under less-than-ideal channel conditions. As a specific example, many test and characterization fixtures are ill-equipped to adequately test or characterize decision feedback equalization (DFE) circuitry of a memory device to determine whether the DFE circuitry properly addresses inter-symbol interference (ISI) encountered by the memory device as a result of properties of a channel.

A brief discussion of ISI and DFE circuitry is provided here for the sake of clarity and understanding. Discontinuities and other properties (e.g., impedance, dielectric loss, length, etc.) of a data channel can affect integrity of a signal transmitted over the data channel, especially as data transmission rates increase. For example, in a memory system that includes a multi-drop data bus operably connecting a memory controller to several memory devices, a portion of a transmission line of the data bus that extends to a far end memory device of the memory system can act as a stub or a discontinuity in the data bus while a signal is transmitted to a more central memory device from the memory controller. Thus, the portion of the transmission line that extends to the far end memory device can cause reflections on the data bus that lessen the integrity of the signal transmitted to the more central memory device. Furthermore, the transmission lines of a multi-drop data bus tend to be relatively short in length. As a result, insertion loss of the data bus does not significantly attenuate reflections on the data bus over the short distances. Therefore, reflections that occur on the data bus tend to remain in the channel for a number of symbol (or bit) intervals of a signal.

ISI is a problem that can arise from energy remaining in a channel for multiple symbol intervals. More specifically, ISI is the effect that a given symbol has on a response from subsequent symbols observed at a receiver. Common causes for ISI include (a) reflected signals that occur due to improper termination (e.g., from stubs in the channel; from on-die termination values that do not match the channel's impedance; from impedance mismatches in packages, connectors, or vias; and/or from non-optimal drive impedances); (b) large capacitive loads in the channel; and/or (c) dispersion effects where different frequencies are attenuated by different amounts (e.g., higher frequencies are attenuated more than lower frequencies, causing the channel to act as a low pass filter and preventing higher frequency spectrums of signals (such as edge transitions) from being transmitted correctly). As a specific example of ISI, a first symbol of a signal can be transmitted over a channel, and energy corresponding to the first signal can be reflected on the channel due to stubs in the channel. Because the channel is relatively short in length, the reflected energy can remain on the channel while a subsequent symbol of the signal is transmitted over the channel. As a result, the reflected energy corresponding to the first symbol can overlap with the subsequent symbol on the channel, making it more difficult to properly resolve the subsequent symbol at the receiver.

Therefore, many memory devices (e.g., DDR5 memory devices) include DFE circuitry to compensate for ISI energy that can remain on a channel due to stubs, imperfect terminations, and other causes. The DFE circuitry of a memory device operates by analyzing a transition of (a) a current symbol of a signal received at the memory device and/or (b) one or more past symbols of the signal received at the memory device, to estimate the effects of the analyzed transition(s) on subsequent symbols of the signal received at the memory device. The DFE circuitry can then use the estimate of the effects of the analyzed transition(s) to attempt to nullify or mitigate the actual effects of the transition(s) on subsequently received symbols of the signal. Therefore, DFE circuitry can be used to cancel, reduce, or mitigate the effects of ISI, and can make it easier for a memory device to properly resolve a subsequently received symbol or bit.

As discussed above, many test and characterization fixtures include channels designed for optimal signal integrity. In other words, these test and characterization fixtures are often unable to adequately simulate ISI at speed (e.g., at data transmission rates commonly employed in memory systems in which the memory devices are integrated). As such, these test and characterization fixtures are often ill-equipped to adequately test or characterize DFE circuitry of a memory device to ensure the DFE circuitry is functioning correctly before the memory device is operably connected to a memory controller and integrated into a memory system. For example, the inventors of the present technology have determined that although some of the above-mentioned test and characterization fixtures can be modified to provide less-than-ideal channel conditions, these test and characterization fixtures are still unable to adequately test and characterize DFE circuitry of a memory device. As a specific example, to generate reflections on a channel, termination can be disabled on some testers while driving a signal to a memory device over the channel. But disabling termination (a) is representative of only a single cause of ISI on the channel and/or (b) typically generates ISI that requires only positive DFE for correction. In other words, disabling termination on a tester does not present simulated ISI to DFE circuitry of a memory device that is representative of ISI that is generated from properties of a channel other than improper termination and/or that requires negative DFE for correction.

As another specific example, it is possible to wave shape a signal up to four levels on some testers and thereby present simulated ISI to DFE circuitry of a memory device. But these testers are not able to provide wave shaping at speed, meaning that these testers cannot test or characterize DFE circuitry of memory devices at data transmission rates commonly employed in memory systems in which the memory devices are integrated. This can be a significant drawback because ISI can be frequency dependent, meaning that any solution employed by a DFE circuit at one transmission rate can be entirely different from a solution employed by the DFE at another transmission rate. Thus, it can be beneficial to test or characterize DFE circuitry at speed (e.g., to determine that the DFE circuitry is operating correctly at data transmission rates that are commonly employed in memory systems in which the memory device can be integrated). In addition, the four-level testing is limited to a single tap ISI value. Furthermore, the simulated ISI generated by wave shaping provides limited testing conditions. In other words, these testers are often not able to present simulated ISI to DFE circuitry of a memory device that is representative of ISI generated from various and/or multiple properties of a channel.

As still another example, the inventors have recognized that many test and characterizations fixtures can be permanently modified to provide less-than-ideal channel conditions and/or to present simulated ISI to DFE circuitry of a memory device. But permanently modifying the test and characterizations fixtures to provide less-than-ideal channel conditions runs contrary to the goal of designing a test and characterization fixture with a channel offering optimal signal integrity. As a result, the permanent modifications to the existing test and characterizations fixtures would limit the ability to test or characterize a memory device under ideal channel conditions, meaning that such permanent modifications introduce a concern that at least a portion of any results observed while testing or characterizing a memory device (e.g., while testing or characterizing components of a memory device other than DFE circuitry) occur as a result of properties of the channel as opposed to properties of the memory device.

To address these concerns, the present technology is directed to interposers for use in testing and characterizing memory devices. More specifically, the present technology is directed to interposers that can be used in or with (e.g., existing) test and characterization fixtures to decrease integrity of signals and/or simulate less-than-ideal channel conditions that are commonly present in memory systems (e.g., to test or characterize DFE circuitry of a memory device before the memory device is integrated into a memory system). In some embodiments, interposers of the present technology include first interfaces couplable to DUTs (e.g., memory devices), second interfaces couplable to one or more testers (e.g., via corresponding motherboards), and channel circuits including resistive elements (e.g., resistors, zero (0) ohm resistors, capacitors, jumpers, switches, transistors, or other circuit elements) coupled between the first interfaces and the second interfaces to couple the DUTs to the testers. The channel circuits of the present technology can include one or more circuit options that can be selectively enabled to affect signals transmitted over the channel circuits. For example, a channel circuit can include a plurality of electrical contacts (e.g., pads) disposed in or on a surface of a corresponding interposer. The plurality of electrical contacts can be arranged in one or more pairs, with each pair configured to receive a circuit component (e.g., a resistor, a capacitor, a wire link, a jumper, or another circuit component) to complete an electrical connection across electrical contacts of the pair. The pairs of electrical contacts can correspond to various circuit options on the channel circuit. Circuit options can include, for example, stubs, simulated on-die termination values of another device on the channel, simulated input/output (I/O) capacitance values of another device on the channel, and/or damping values. Therefore, pairs of electrical contacts of a channel circuit can be used to selectively enable a corresponding circuit option by completing an electrical connection across the corresponding electrical contacts of the pair using a circuit component.

Furthermore, in some embodiments, pairs of electrical contacts can be arranged in and/or correspond to different configurations of the channel circuit. For example, a subset of the pairs of electrical contacts can be arranged in a first arrangement and/or correspond to a configuration in which the channel circuit simulates one additional device operably connected to the channel. Additionally, or alternatively, another subset of the pairs of electrical contacts can be arranged in a second arrangement and/or correspond to another configuration in which the channel circuit simulates multiple additional devices operably connected to the channel. In embodiments including both the one additional device per channel configuration and the multiple additional devices per channel configuration, a pair of electrical contacts can be used to selectively enable one of the configurations and/or to selectively disable the other of the configurations.

In this manner, interposers having channel circuits configured in accordance with the present technology offer the ability to quickly create channels with desired properties by selectively enabling circuit options and/or configurations of the channel circuits (e.g., by selectively coupling electrical contacts of corresponding pairs to one another using various circuit components). Stated another way, interposers of the present technology include channel circuits that are configurable via one or more resistive elements (e.g., resistors, zero (0) ohm resistors, capacitors, jumpers, switches, transistors, or other circuit elements) to change measurable values (e.g., one or more symbols, voltage levels of one or more symbols) of signals transmitted over the channel circuits (e.g., via generated ISI, enabled circuit options, and/or simulated channel conditions). In other words, based at least in part on (a) which of the pairs of a channel circuit include electrical contacts that are electrically coupled to one another via circuit components, and (b) the resistance, capacitance, or other properties of those circuit components, channel conditions of the channel circuit be customized, tailored, or altered to generate ISI and/or to achieve a desired effect on (e.g., decrease the integrity of) signals transmitted over the channel circuit. The channel circuits can generate ISI requiring positive DFE solutions, negative DFE solutions, or both positive and negative DFE solutions. In addition, the generated ISI can simulate ISI that occurs as a result of various and/or multiple properties of a channel. Interposers of the present technology therefore offer the ability to quickly create channels with properties that simulate channel properties of a system into which a DUT can be incorporated. These interposers can then be used to test or characterize a DUT (e.g., DFE circuitry of the DUT) at speed to ensure the DUT is likely to reliably function as intended in that system before the DUT is actually incorporated into that system.

In these and other embodiments, the interposers can be reversibly or removably operably connected to a DUT (e.g., via the first interfaces) and/or to one or more testers (e.g., via the second interfaces and/or the motherboards). For example, a first interface of an interposer of the present technology can include a socket configured to provide solderless connections with a DUT. Additionally, or alternatively, a second interface of an interposer of the present technology can include electrical contacts that facilitate operably connecting the interposer to a tester, such as via a socket on a motherboard that is configured to provide solderless connections with the interposer and/or with the DUT. Thus, a first DUT can be quickly swapped out for a second DUT on the interposer. Furthermore, a first interposer can be quickly swapped out for a second interposer (e.g., having a different channel circuit configuration and/or different channel circuit properties). In some embodiments, the interposer can be removed, allowing a DUT to be operably connected directly to a tester without an intervening interposer and/or corresponding channel circuit (e.g., to test or characterize the DUT under ideal channel conditions).

Figure 1:
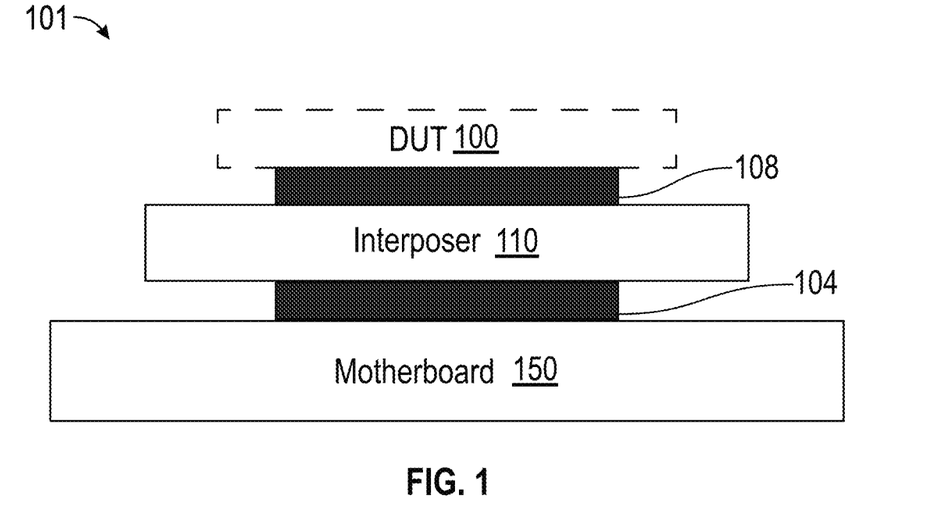
FIG. 1 is a partially schematic representation of a memory testing system configured in accordance with various embodiments of the present technology.

FIG. 1 is a partially schematic representation of a memory testing system 101 ("the system 101") configured in accordance with various embodiments of the present technology. As shown, the system 101 includes an interposer 110 and a motherboard 150. The motherboard 150 includes a socket 104 operably connecting the interposer 110 to a tester (not shown). Additionally, or alternatively, the interposer 110 includes a first interface 108 configured to operably connect a device under test 100 ("DUT 100"), such as a memory device, to the interposer 110. Thus, the DUT 100 can be operably connected to the tester via the first interface 108, the interposer 110, the socket 104, and the motherboard 150.

In the illustrated embodiment, the first interface 108 includes a socket. In some embodiments, the socket 104 and/or the socket of the first interface 108 can provide solderless and/or temporary interconnections (a) between the interposer 110 and the motherboard 150 and/or (b) between the DUT 100 and the interposer 110, respectively. For example, the socket 104 and/or the socket of the first interface 108 can be a PariPoser® socket commercially available from Paricon Technologies Corporation of Taunton, Massachusetts. Thus, in some embodiments, the interposer 110 can be reversibly, operably connected to the motherboard 150 via the socket 104. Such solderless and/or temporary interconnections offered by the socket 104 can facilitate quickly testing multiple arrangements of the system 101, such as by offering the ability to quickly swap out (a) a first interposer 110 and/or a first interposer 110/DUT 100 arrangement for (b) a second interposer 110 and/or a second interposer 110/DUT 100 arrangement. Additionally, or alternatively, the DUT 100 can be reversibly, operably connected to the interposer 110 via the socket of the first interface 108. Such solderless and/or temporary interconnections offered by the socket of the first interface 108 can facilitate quickly testing multiple DUTs 100, such as by offering the ability to quickly swap out a first DUT 100 operably connected to the interposer 110 via the socket for a second DUT 100. In other embodiments, the first interface 108 can include electrical pads or contacts (e.g., in addition to or in lieu of a socket), the DUT 100 can be soldered to the interposer 110 (e.g., to the electrical pads or contacts of the first interface 108), and/or the interposer 110 can be soldered to the motherboard 150.

As discussed in greater detail below, the interposer 110 includes a channel circuit (not shown in FIG. 1) that is configured to operably connect the DUT 100 to the motherboard 150 (and/or to a tester operably connected to the motherboard 150). The channel circuit of the interposer 110 can further include one or more circuit options that, when (e.g., selectively) enabled or activated, can each simulate channel discontinuities or other channel properties that commonly contribute at least in part to generating ISI and/or contribute to other less-than-ideal channel conditions. For example, the channel circuit of the interposer 110 can include one or more stubs that can optionally be electrically connected to a channel that operably connects the DUT 100 to the motherboard 150. When a stub is electrically connected to the channel and a signal is driven over the channel, the stub can generate reflections on the channel that can cause ISI or other problems at the DUT 100. As such, the interposer 110 can be used to simulate less-than-ideal channel conditions that the DUT 100 may encounter when the DUT 100 is integrated into an end system. Therefore, in embodiments in which the DUT 100 is a memory device (e.g., a DDR5 memory device) that includes DFE circuitry, the interposer 110 can facilitate testing and characterizing the DFE circuitry of the memory device before the memory device is integrated into a memory system.

Although the system 101 is illustrated in FIG. 1 with the DUT 100 operably connected to the motherboard 150 via the interposer 110, the DUT 100 can be operably connected to the motherboard 150 directly via the socket 104 in some embodiments of the present technology. For example, the interposer 110 can be removed, and/or the DUT 100 can be operably connected to the tester by operably connecting the DUT 100 directly to the motherboard 150 via the socket 104. Therefore, the system 101 in some embodiments can provide the ability to test or characterize the DUT 100 under ideal or optimal channel conditions by, for example, connecting the DUT 100 directly to the motherboard 150 via the socket 104; disabling one or more circuit options in the channel circuit of the interposer 110 when transmitting a signal to or from the DUT 100 through the channel circuit; and/or using a separate channel in the interposer 110 that lacks discontinuities or other properties that generate ISI, that is designed for optimal signal integrity, and/or that extends directly from the motherboard 150 through the interposer 110 to the DUT 100. In addition, the system 101 can provide the ability to test or characterize the DUT 100 under less-than-ideal channel conditions by, for example, indirectly connecting the DUT 100 to the motherboard 150 via the interposer 110 and/or enabling one or more circuit options in the channel circuit of the interposer 110 when transmitting a signal to or from the DUT 100 through the channel circuit.

Figure 2A:
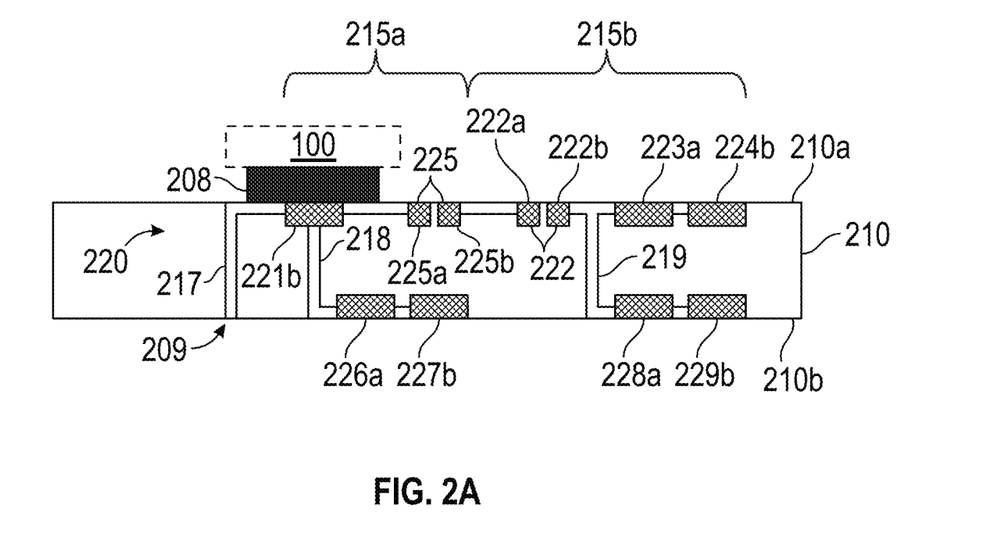
FIG. 2A is a partially schematic side view of an interposer configured in accordance with various embodiments of the present technology.
Figure 2B:
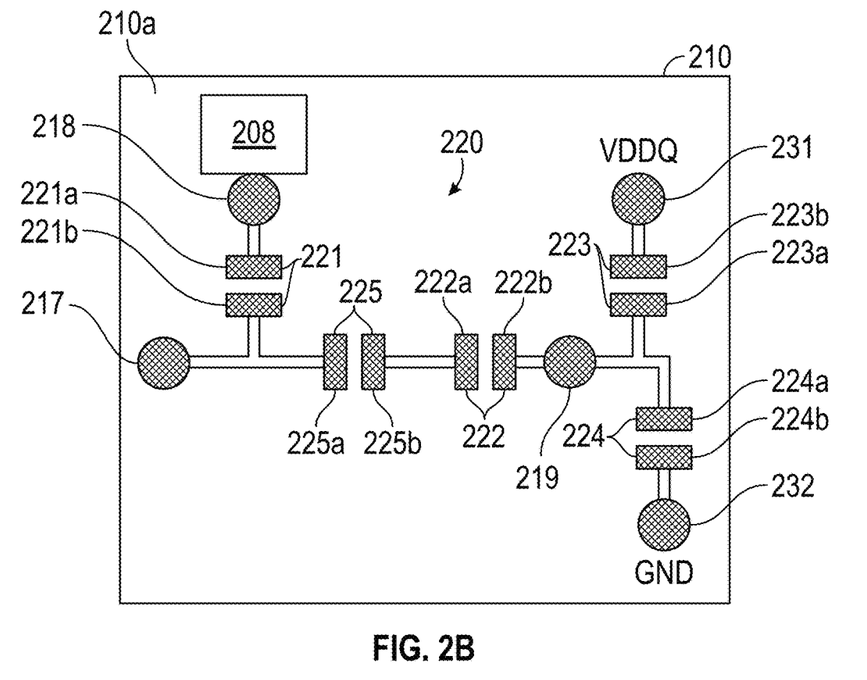
FIG. 2B is a partially schematic top view of the interposer of FIG. 2A.
Figure 2C:
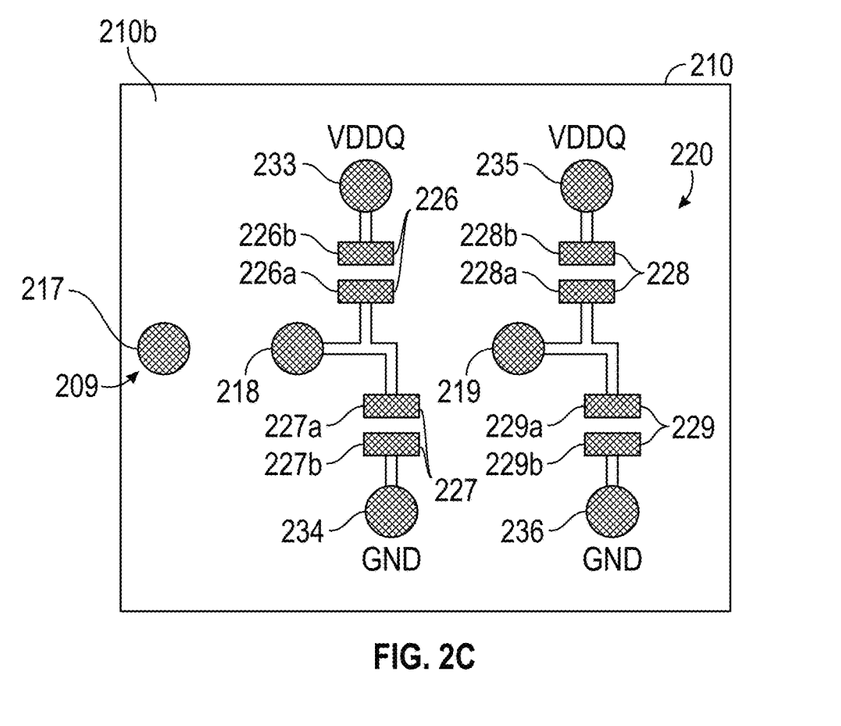
FIG. 2C is a partially schematic bottom view of the interposer of FIGS. 2A and 2B.

FIG. 2A is a partially schematic side view of an interposer 210 configured in accordance with various embodiments of the present technology. More specifically, FIG. 2A provides a partially schematic side view of a channel circuit 220 of the interposer 210 with the substrate material of the interposer 210 illustrated as transparent. FIG. 2B is a partially schematic top view of the interposer 210 of FIG. 2A, and FIG. 2C is a partially schematic bottom view of the interposer 210 of FIG. 2A. In some embodiments, the interposer 210 can be the interposer 110 of FIG. 1 or another interposer of the present technology.

As best shown in FIG. 2A, the channel circuit 220 of the interposer 210 includes a channel configured to operably connect a DUT 100 at a top side or surface 210a of the interposer 210 to another device (e.g., to the motherboard 150 of FIG. 1) at a bottom surface 210b of the interposer 210. For example, a first interface 208, a via 217 (e.g., a plating through hole ("PTH") via or another type of via), a second interface 209, and/or other transmission lines or components of the channel circuit 220 can be used to operably connect (e.g., one or more pins or terminals of) a DUT 100 at the top surface 210a of the interposer 210 to a motherboard, tester, and/or another device at the bottom surface 210b of the interposer 210. As discussed above, the first interface 208 can include a socket. The socket of the first interface 208 can be generally similar to the socket of the first interface 108 of FIG. 1. As such, the socket of the first interface 208 can facilitate reversibly, operably connecting the DUT 100 to the channel circuit 220 of the interposer 210. In other embodiments, the first interface 208 can include electrical pads or contacts at the top surface 210a of the interposer 210 to which the DUT 100 can be soldered or otherwise electrically coupled. The second interface 209 of the interposer 210 can include one or more electrical contacts at the bottom surface 210b of the interposer 210 for electrically coupling the interposer 210 to another device, such as to the motherboard 150 of FIG. 1 (e.g., via the socket 104 of FIG. 1).

The channel circuit 220 of FIGS. 2A-2C can further include various circuit options that can be enabled to affect signals transmitted to or from the DUT 100 over the channel circuit 220. For example, the channel circuit 220 can include a plurality of electrical contacts (e.g., pads, sockets, etc.) disposed in or on the top surface 210a and/or in or on the bottom surface 210b of the interposer 210. The plurality of electrical contacts of the channel circuit 220 can be arranged in one or more pairs, with each pair configured to receive or be electrically coupled to a circuit component (e.g., a resistor, a capacitor, or another component) that can complete an electrical connection across the corresponding electrical contacts. Referring to FIGS. 2A and 2B together, for example, the channel circuit 220 of the interposer 210 includes five pairs 221-225 of electrical contacts disposed in or on the top side 210a of the interposer 210: (1) a first pair 221 including electrical contacts 221a and 221b, (2) a second pair 222 including electrical contacts 222a and 222b, (3) a third pair 223 including electrical contacts 223a and 223b, (4) a fourth pair 224 including electrical contacts 224a and 224b, and (5) a fifth pair 225 including electrical contacts 225a and 225b. As shown in FIGS. 2A and 2C, the channel circuit 220 can include four additional pairs 226-229 of electrical contacts disposed in or on the bottom side 210b of the interposer 210: (1) a sixth pair 226 including electrical contacts 226a and 226b, (2) a seventh pair 227 including electrical contacts 227a and 227b, (3) an eighth pair 228 including electrical contacts 228a and 228b, and (4) a ninth pair 229 including electrical contacts 229a and 229b.

In some embodiments, the pairs 221-229 of electrical contacts can be generally positioned in or on the interposer 210 to simulate other devices (e.g., memory devices) on the channel of the channel circuit 220 (e.g., to simulate various clamshell arrangements seen on dual in-line memory modules ("DIMMs")). For example, as shown in FIG. 2A, the pairs 221-229 can be positioned in or on the interposer 210 in one of two arrangements: a first arrangement 215a or a second arrangement 215b. The first arrangement 215a on the interposer 210 can include the first pair 221 of electrical contacts, the sixth pair 226 of electrical contacts, and/or the seventh pair 227 of electrical contacts. The first arrangement 215a can further include a via 218 (e.g., a PTH via or another type of via) electrically coupling the electrical contact 221a (FIG. 2B) of the first pair 221 to the electrical contacts 226a and 227a (FIG. 2C) of the sixth and seventh pairs 226 and 227, respectively. As discussed in greater detail below, the first arrangement 215a can be used to simulate one additional device (e.g., one memory device or one memory DIMM) electrically coupled to the channel of the channel circuit 220 (e.g., to simulate a first clamshell arrangement in which two DRAM memory devices/DIMMs are positioned on opposite sides of a substrate and connected to the same channel). Therefore, when the first arrangement 215a is used to affect channel conditions on the channel circuit 220, the channel circuit 220 can be referred to as operating in a one-device-per-channel or one-DIMM-per-channel ("1DPC") mode or configuration or as having the 1DPC configuration enabled.

Additionally, or alternatively, the second arrangement 215b on the interposer 210 can include the second pair 222 of electrical contacts, the third pair 223 of electrical contacts, the fourth pair 224 of electrical contacts, the eighth pair 228 of electrical contacts, and/or the ninth pair 229 of electrical contacts. The second arrangement 215b can further include a via 219 (e.g., a PTH via or another type of via) electrically coupling (a) the electrical contacts 222b, 223a, and 224a of the second, third, and fourth pairs 222, 223, and 224, respectively, to (b) the electrical contacts 228a and 229a of the eight and ninth pairs 228 and 229, respectively. As discussed in greater detail below, the second arrangement 215b can be used to simulate two additional devices (e.g., memory devices or memory DIMMs) electrically coupled to the channel of the channel circuit 220 (e.g., to simulate a second clamshell arrangement in which two sets of DRAM memory devices/DIMMs are positioned on opposite sides of a substrate and connected to the same channel). Therefore, when the second arrangement 215b is used to affect channel conditions on the channel circuit 220, the channel circuit 220 can be referred to as operating in a two-device-per-channel or two-DIMM-per-channel ("2DPC") mode or configuration or as having the 2DPC configuration enabled.

Each of the plurality of electrical contacts of the channel circuit 220 can be configured to receive or to be electrically coupled (e.g., soldered) to a resistive element or circuit component, such as a resistor, capacitor, or another component. As discussed in greater detail below with reference to FIG. 3, the circuit components can be used to complete electrical connections between select legs of the channel circuit 220 and to shape signals transmitted to or from the DUT 100 (FIG. 2A) over the channel circuit 220. For example, referring to FIGS. 2A and 2B, the electrical contacts 225a and 225b of the fifth pair 225 (a) are electrically positioned between the first arrangement 215a and the second arrangement 215b, and (b) can optionally be electrically coupled to one another via a circuit component, such as a resistor. As a specific example, the electrical contacts 225a and 225b can be electrically coupled to one another via a 0-ohm resistor, a wire link, or a jumper. Thus, the fifth pair 225 of electrical contacts can be used to optionally enable the second arrangement 215b (FIG. 2A) of the channel circuit 220. More specifically, the second arrangement 215b of the channel circuit 220 can be (a) disabled by leaving the electrical contacts 225a and 225b electrically isolated from one another, or (b) enabled by electrically coupling the electrical contacts 225a and 225b to one another using a circuit component. Similarly, selectively coupling corresponding electrical contacts of the other pairs 221-224 and/or 226-229 of the channel circuit 220 to one another using circuit components can enable corresponding circuit options of the channel circuit 220 and thereby alter properties of the channel of the channel circuit 220. In other words, based at least in part on (a) which of the pairs 221-229 include electrical contacts that are electrically coupled to one another via circuit components, and (b) the resistance, capacitance, or other properties of those circuit components, channel conditions of the channel circuit 220 be customized, tailored, or altered to generate ISI and/or to achieve a desired effect on signals transmitted over the channel circuit 220.

Figure 3:
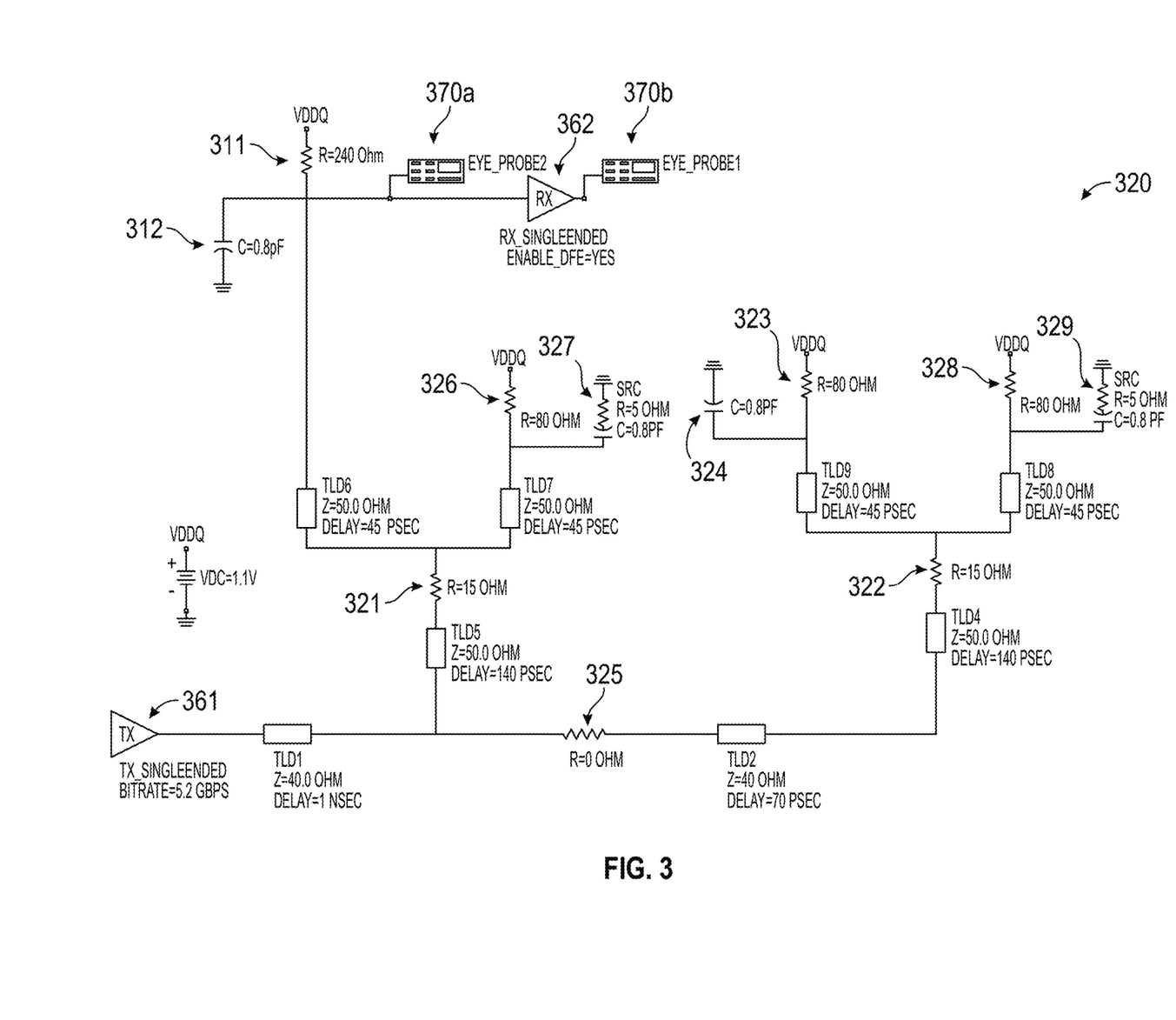
FIG. 3 is a partially schematic circuit diagram of a channel circuit included on an interposer configured in accordance with various embodiments of the present technology.

FIG. 3 is a partially schematic circuit diagram of a channel circuit 320 configured in accordance with various embodiments of the present technology. The channel circuit 320 can be one implementation of the channel circuit 220 of FIGS. 2A-2C described above. In particular, the channel circuit 320 includes various circuit components 321-329 electrically coupling corresponding pairs 221-229 of the electrical contacts of the channel circuit 220 of FIGS. 2A-2C. For example, the electrical contacts 221a and 221b of the first pair 221 of electrical contacts of the channel circuit 220 (FIGS. 2A and 2B) can be configured to receive a first resistor 321 of the channel circuit 320 illustrated in FIG. 3 (or another circuit component). Additionally, or alternatively, the electrical contacts 222a and 222b of the second pair 222 of the channel circuit 220 (FIGS. 2A and 2B) can be configured to receive a second resistor 322 of the channel circuit 320 illustrated in FIG. 3 (or another circuit component). Therefore, the electrical contacts 221a and 221b of the first pair 221 of electrical contacts can optionally be electrically coupled to one another via the first resistor 321 of FIG. 3, and/or the second pair 222 of electrical contacts can optionally be electrically coupled to one another via the second resistor 322 of FIG. 3.

In some embodiments, the first resistor 321 and/or the second resistor 322 can be employed as damping resistors. Thus, the first resistor 321 and/or the second resistor 322 can be used to adjust (e.g., reduce, mitigate, cancel, attenuate, enhance, increase) reflections on the channel circuits 220 and 320, adjust the cutoff frequency response of the channel circuits 220 and 320, and/or adjust time of flight of signals transmitted over the channel circuits 220 and 320, at least when the first resistor 321 and/or the second resistor 322 resistor (a) are electrically coupled to electrical contacts 221a and 221b and/or to the electrical contacts 222a and 222b, respectively, and (b) are placed in electrical communication with the first interface 208 (FIGS. 2A and 2B) of the channel circuit 220 and/or a DUT 100 (illustrated as capacitor 321/resistor 311/receiver 362 in FIG. 3) operably coupled to the interposer 210.

In these and other embodiments, the electrical contacts 223a and 223b of the third pair 223 of the channel circuit 220 (FIGS. 2A and 2B) can be configured to receive a third resistor 323 of the channel circuit 320 illustrated in FIG. 3 (or another circuit component). Therefore, the electrical contacts 223a and 223b of the third pair 223 of electrical contacts can optionally be electrically coupled to one another via the third resistor 323 of FIG. 3. As shown in FIG. 2B, the electrical contact 223b of the third pair 223 can be electrically coupled to a power supply voltage $V_{DDQ}$, such as through a via 231 (e.g., a PTH or another type of via). Thus, the third resistor 323 of FIG. 3 can be employed to simulate (e.g., emulate, mimic, provide a similar channel effect as) an on-die termination resistance value of another device (e.g., another memory device) electrically coupled to the channel circuits 220 and 320, at least when the third resistor 323 (a) is electrically coupled to the electrical contacts 223a and 223b of the third pair 223 and (b) is placed in electrical communication with the first interface 208 (FIGS. 2A and 2B) of the channel circuit 220 and/or a DUT 100 electrically coupled to the interposer 210.

In some embodiments, the electrical contacts 226a and 226b of the sixth pair 226 of electrical contacts of the channel circuit 220 (FIGS. 2A and 2C) and/or the electrical contacts 228a and 228b of the eight pair 228 of the channel circuit 220 (FIGS. 2A and 2C) can be configured to receive a fourth resistor 326 and/or a fifth resistor 328 of the channel circuit 320 illustrated in FIG. 3, respectively, (or other circuit components). Therefore, the electrical contacts 226a and 226b of the sixth pair 226 of electrical contacts can optionally be electrically coupled to one another via the fourth resistor 326 of FIG. 3, and/or the electrical contacts 228a and 228b of the eighth pair 228 of electrical contacts can optionally be electrically coupled to one another via the fifth resistor 328 of FIG. 3. Additionally, or alternatively, the electrical contact 226b of the sixth pair 226 and/or the electrical contact 228b of the eighth pair 228 of the channel circuit 220 of FIGS. 2A and 2C can be generally similar to the electrical contact 223b of the third pair 223 of the channel circuit 220 (FIGS. 2A and 2B) discussed above. For example, the electrical contacts 226b and 228b (FIG. 2C) can be electrically coupled to the power supply voltage $V_{DDQ}$, such as through corresponding vias 233 and 235 (e.g., PTH vias or other types of vias) of FIG. 2C. Thus, the fourth resistor 326 and/or the fifth resistor 328 of FIG. 3 can be employed to simulate on-die termination values of other devices (e.g., other memory devices) electrically coupled to the channel circuits 220 and 320, at least when the fourth resistor 326 and/or the fifth resistors 328 (a) are electrically coupled to the electrical contacts 226a and 226b and/or to the electrical contacts 228a and 228b, respectively, and (b) are placed in electrical communication with the first interface 208 (FIGS. 2A and 2B) of the channel circuit 220 and/or a DUT 100 electrically coupled to the interposer 210.

In these and still other embodiments, the electrical contacts 224a and 224b of the fourth pair 224 of the channel circuit 220 (FIGS. 2A and 2B) can be configured to receive a first capacitor 324 of the channel circuit 320 illustrated in FIG. 3 (or another circuit component). Therefore, the electrical contacts 224a and 224b of the fourth pair 224 of electrical contacts can optionally be electrically coupled to one another via the first capacitor 324 of FIG. 3. As shown in FIG. 2B, the electrical contact 224b of the fourth pair can be electrically grounded, such as through a via 232 (e.g., a PTH or another type of via). Thus, the first capacitor 324 of FIG. 3 can be employed to simulate (e.g., emulate, mimic, provide a similar effect as) an I/O capacitance value of another device (e.g., another memory device) electrically coupled to the channel circuits 220 and 320, at least when the first capacitor 324 (a) is electrically coupled to the electrical contacts 224a and 224b of the fourth pair 224 and (b) is placed in electrical communication with the first interface 208 (FIGS. 2A and 2B) of the channel circuit 220 and/or a DUT 100 electrically coupled to the interposer 210.

In some embodiments, the electrical contacts 227a and 227b of the seventh pair 227 of electrical contacts of the channel circuit 220 (FIGS. 2A and 2C) and/or the electrical contacts 229a and 229b of the ninth pair 229 of the channel circuit 220 (FIGS. 2A and 2C) can be configured to receive a second capacitor 327 and/or a third capacitor 329 of the channel circuit 320 illustrated in FIG. 3, respectively, (or other circuit components). Therefore, the electrical contacts 227a and 227b of the seventh pair 227 of electrical contacts can optionally be electrically coupled to one another via the second capacitor 327 of FIG. 3, and/or the electrical contacts 229a and 229b of the ninth pair 229 of electrical contacts can optionally be electrically coupled to one another via the third capacitor 329 of FIG. 3. Additionally, or alternatively, the electrical contact 227b of the seventh pair 227 and/or the electrical contact 229b of the ninth pair 229 of the channel circuit 220 can be generally similar to the electrical contact 224b of the fourth pair 224 of the channel circuit 220 (FIGS. 2A and 2B) discussed above. For example, the electrical contacts 227b and 229b of FIG. 2C can be electrically grounded, such as through corresponding vias 234 and 236 (e.g., PTH vias or other types of vias). Thus, the second capacitor 327 and/or the third capacitor 329 of FIG. 3 can be employed to simulate I/O capacitance values of other devices (e.g., other memory devices) electrically coupled to the channel circuits 220 and 320, at least when the second capacitor 327 and/or third capacitor 329 (a) are electrically coupled to the electrical contacts 227a and 227b and/or to the electrical contacts 229a and 229b, respectively, and (b) are placed in electrical communication with the first interface 208 (FIGS. 2A and 2B) of the channel circuit 220 and/or a DUT 100 electrically coupled to the interposer 210.

As discussed above, the electrical contacts 225a and 225b of the fifth pair 225 of electrical contacts of the channel circuit 220 (FIGS. 2A and 2B) can optionally be electrically coupled to one another via a circuit component, such as via a sixth resistor 325 of the channel circuit 320 illustrated in FIG. 3 or via another circuit component. In FIG. 3, the sixth resistor 325 is a 0-ohm resistor and can essentially be used as a wire link to enable the right-half portion of the channel circuit 320 in FIG. 3 (e.g., the portion of the channel circuit 320 that corresponds to the second arrangement 215b of the channel circuit 220 illustrated in FIG. 2A). More specifically, a 2DPC configuration of the channel circuit 320 can be (a) disabled by omitting the sixth resistor 325 from the channel circuit 320 (thereby leaving the electrical contacts 225a and 225b of the fifth pair 225 of the channel circuit 220 of FIGS. 2A-2C electrically isolated from one another), or (b) enabled by including the sixth resistor 325 in the channel circuit 320 and electrically coupling the electrical contacts 225a and 225b of the fifth pair 225 of the channel circuit 220 via the sixth resistor 325 (e.g., assuming that (a) the first resistor 321, (b) the second resistor 322, and (c) the third resistor 323, the first capacitor 324, the fifth resistor 328, and/or the third capacitor 329 are employed in the channel circuit 320, as discussed above). In some embodiments, the fourth resistor 326 and/or the second capacitor 327 can be omitted from the channel circuit 320 (e.g., to disable the portion of the channel circuit 320 that corresponds to the first arrangement 215a of the channel circuit 220 of FIG. 2A) when the channel circuit 320 includes the sixth resistor 325 and/or the 2DPC configuration is enabled. In other embodiments, the channel circuit 320 can include the fourth resistor 326 and/or the second capacitor 327 when the channel circuit 320 includes the sixth resistor 325 and/or the 2DPC configuration is enabled.

In some embodiments, a 1DPC configuration of the channel circuit 320 can be enabled when the channel circuit 320 omits the sixth resistor 325 (e.g., assuming that (a) the first resistor 321 and (b) the fourth resistor 326 and/or the second capacitor 327 are employed in the channel circuit 320, as discussed above). In these and other embodiments, the fourth resistor 326 and/or the second capacitor 327 can be omitted from the circuit 320 when the sixth resistor 325 is omitted from the channel circuit 320. In such embodiments, assuming that the channel circuit 320 includes the first resistor 321 or another circuit component electrically coupling the electrical contacts 221a and 221b of the first pair 221 of the channel circuit 220 (FIGS. 2A-2C), the channel circuit 320 can include a point-to-point channel between (a) the DUT 100 electrically coupled to the interposer 210 at the top side 210a of the interposer 210 and (b) another device (e.g., the motherboard 150 of FIG. 1) electrically coupled to the interposer 210 at the bottom side 210b of the interposer 210.

Figure 4A:
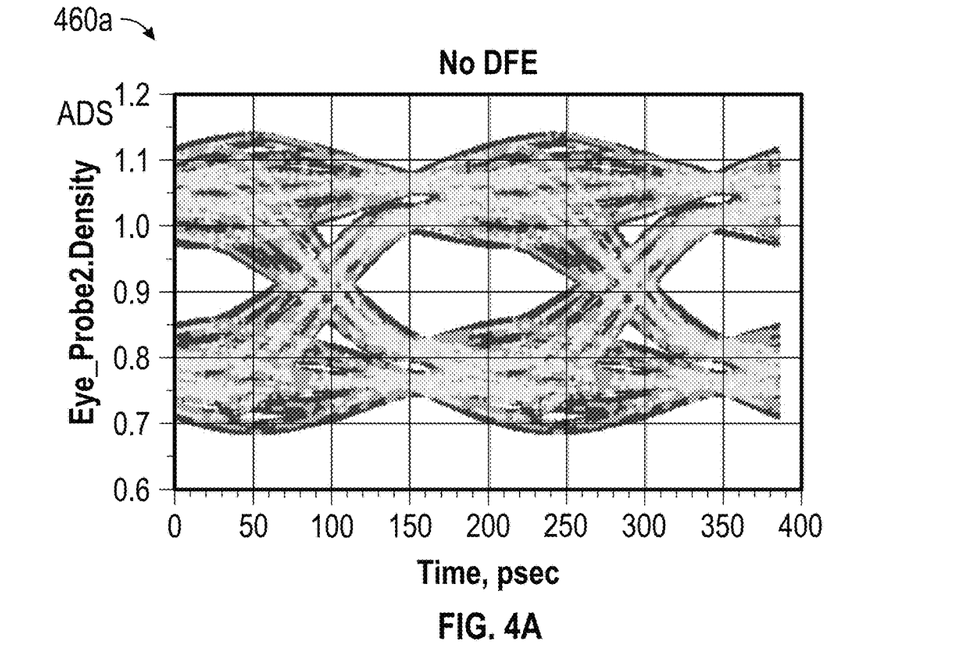
FIGS. 4A and 4B are eye plots corresponding to a two-device-per-channel implementation of the circuit diagram of FIG. 3.
Figure 4B:
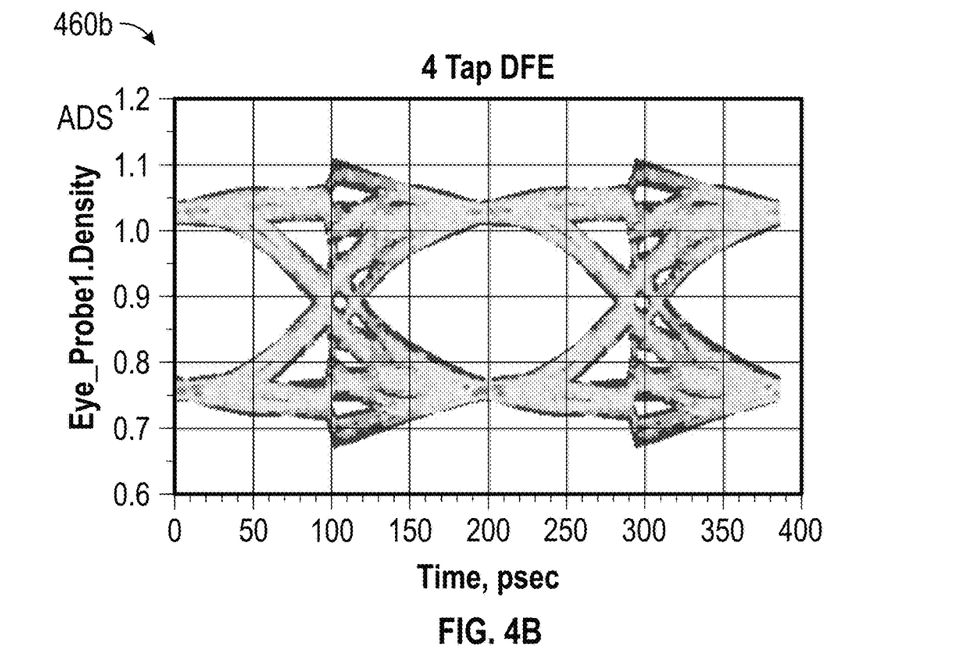

For the sake of example, each of the circuit components 321-329 of the channel circuit 320 are illustrated in FIG. 3 with a corresponding resistance and/or a corresponding capacitance, and each of the signal transmission lines and vias are illustrated in FIG. 3 as having a corresponding resistance and propagation delay. FIGS. 4A and 4B are eye plots 460a and 460b, respectively, corresponding to this example of the channel circuit 320. More specifically, a memory device having an on-die termination resistance value represented by resister 311 in FIG. 3, an I/O capacitance value represented by the capacitor 312 in FIG. 3, and DFE circuitry (represented as a receiver 362 in FIG. 3), was electrically coupled to a tester (represented as transmitter 361 in FIG. 3) via the channel circuits 220 and 320 of the interposer 210 of FIGS. 2A-3 while the 2DPC configuration of the channel circuit 320 (e.g., the second arrangement 215b of FIG. 2A) was enabled via the sixth resistor 325 of FIG. 3. A first eye probe 370a was used to monitor the input of the DFE circuitry (representative of signals received at the memory device from the tester, over the channel circuit 320 of FIG. 3, and prior to processing the signals using the DFE circuitry of the memory device) and to generate the eye plot 460a of FIG. 4A. A second eye probe 370b was used to monitor the output of the DFE circuitry (representative of signals received by the memory device from the tester, over the channel circuit 320, and after processing the signals using the DFE circuitry of the memory device) and to generate the eye plot 460b of FIG. 4B.

As shown in FIG. 4A, the eye opening or the unit interval width in the eye plot 460a is closed or significantly smaller than the eye opening or the unit interval width in the eye plot 460b. This indicates that (a) although the integrity of signals transmitted over the channel circuit 320 of FIG. 3 was significantly affected due to properties of the channel circuit 320 while the channel circuit 320 was operated in the 2DPC configuration and (b) although the memory device observed ISI at the receiver 362, the DFE circuitry of the memory device was able to significantly mitigate the effects of ISI and improve signal integrity. In other words, the eye plots 460a and 460b evidence that the DFE circuitry of the memory device was functioning as intended. Stated another way, the eye plots 460a and 460b indicate that it is likely that the DFE circuitry of the memory device will reliably function as intended when the memory device is incorporated into a 2DPC memory system having a channel with properties similar to the properties of the channel circuit 320 of FIG. 3.

Figure 5A:
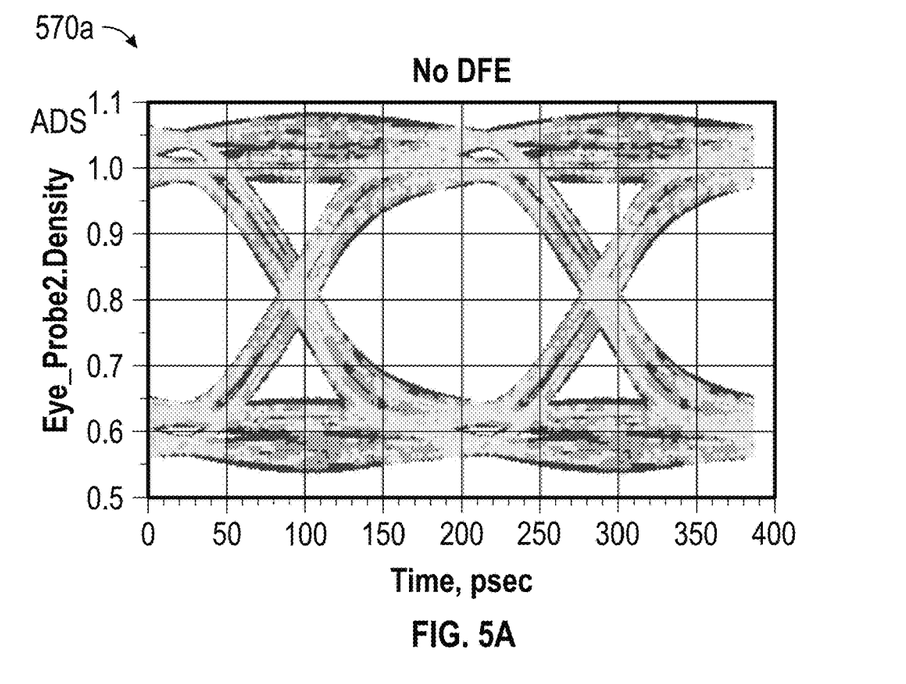
FIGS. 5A and 5B are eye plots corresponding to a one-device-per-channel implementation of the circuit diagram of FIG. 3.
Figure 5B:
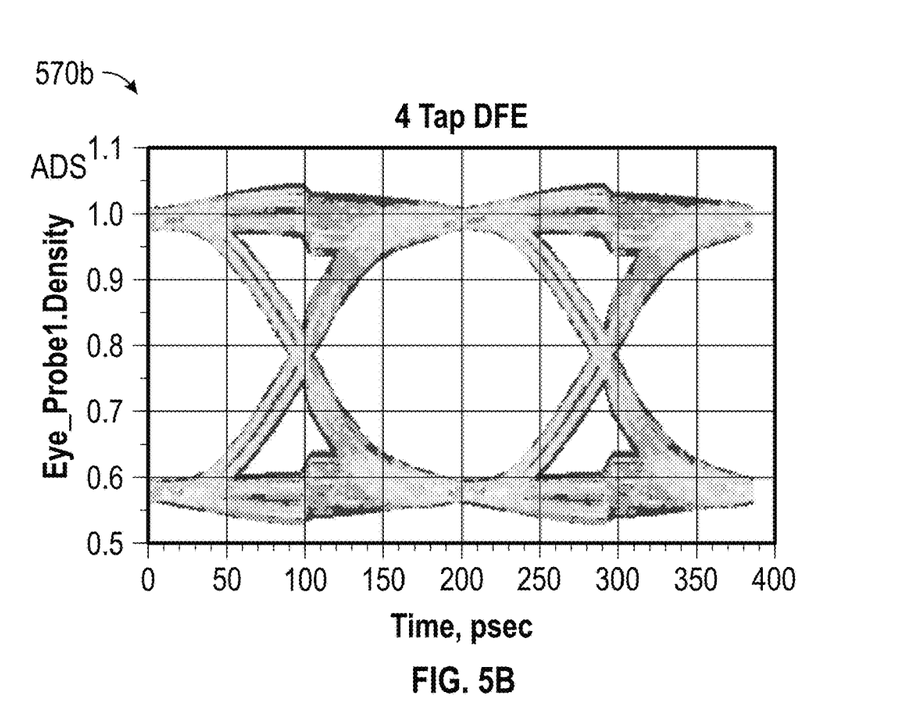

FIGS. 5A and 5B are eye plots 570a and 570b, respectively, corresponding to the channel circuit 320 of FIG. 3 while the channel circuit 320 was operated in the 1DPC configuration. More specifically, a memory device having an on-die termination resistance value represented by resister 311 in FIG. 3, an I/O capacitance value represented by the capacitor 312 in FIG. 3, and DFE circuitry (represented as a receiver 362 in FIG. 3), was electrically coupled to a tester (represented as transmitter 361 in FIG. 3) via the channel circuits 220 and 320 of the interposer 210 of FIGS. 2A-3 while (i) the 2DPC configuration of the channel circuit 320 (e.g., the second arrangement 215b of FIG. 2A) was disabled by omitting the sixth resistor 325 (FIG. 3) from the channel circuit 320, and (ii) the 1DPC configuration of the channel circuit 320 (e.g., the first arrangement 215a of FIG. 2A) was enabled. A first eye probe 370a was used to monitor the input of the DFE circuitry (representative of signals received at the memory device from the tester, over the channel circuit 320, and prior to processing the signals using the DFE circuitry of the memory device) and to generate the eye plot 570a of FIG. 5A. A second eye probe 370b was used to monitor the output of the DFE circuitry (representative of signals received by the memory device from the tester, over the channel circuit 320, and after processing the signals using the DFE circuitry of the memory device) and to generate the eye plot 570b of FIG. 5B.

As shown in FIGS. 5A and 5B, the eye opening or the unit interval width in the eye plot 570a (FIG. 5A) is slightly more closed or smaller than the eye opening or the unit interval width in the eye plot 570b (FIG. 5B). This indicates that (a) although the integrity of signals transmitted over the channel circuit 320 of FIG. 3 was slightly affected due to properties of the channel circuit 320 while the channel circuit 320 was operated in the 1DPC configuration and (b) although the memory device observed minor ISI at the receiver 362, the DFE circuitry of the memory device was able to mitigate the effects of ISI and improve signal integrity. In other words, the eye plots 570a and 570b evidence that the DFE circuitry of the memory device is functioning as intended. Stated another way, the eye plots 570a and 570b indicate that it is likely that the DFE circuitry of the memory device will reliably function as intended when the memory device is incorporated into a 1DPC memory system having a channel with properties similar to the properties of the channel circuit 320 of FIG. 3 operating in the 1DPC configuration.

Figure 6:
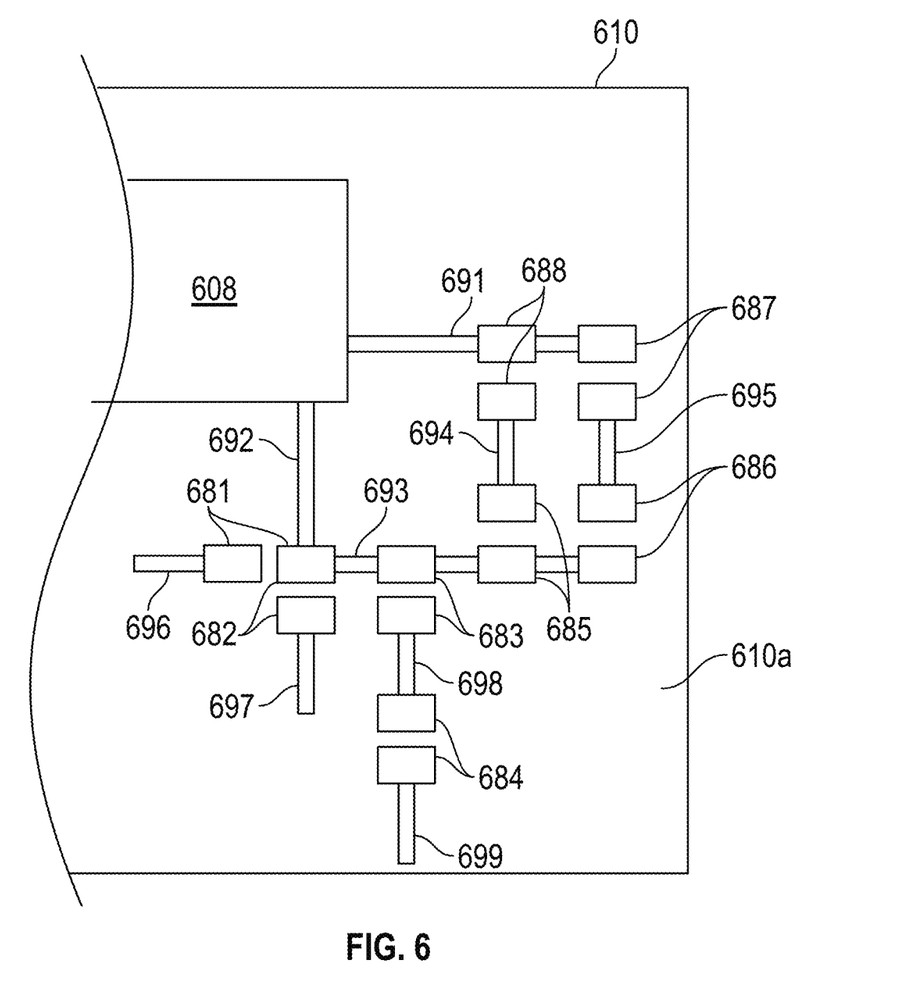
FIG. 6 is a partially schematic partial top view of another interposer configured in accordance with various embodiments of the present technology.

In some embodiments, the channel circuits 220 and/or 320 illustrated in FIG. 6 can be repeated across the interposer 210, for example, to operably connect the channel circuits 220 and/or 320 to different pins or terminals of a DUT. Thus, the same or different channel configurations having the same or different channel options enabled can be used on the interposer 610 to test or characterize different DFE circuits operably connected to different pins or terminals of a DUT 100 operably connected to the interposer 210.

Although shown in FIGS. 2A-2C and 3 with nine pairs of electrical contacts arranged in the 1DPC configuration 215a and the 2DPC configuration 215b illustrated in FIG. 2A, a person of ordinary skill in the art will readily appreciate that interposers having channel circuits with a different number of pairs of electrical contacts (e.g., less than or greater than nine pairs), different circuit options, different circuit option positionings and/or channel configurations, and/or different channel properties than shown in FIGS. 2A-3 remain within the scope of the present technology. For example, pairs of electrical contacts illustrated at the top side 210a of the interposer 210 in FIGS. 2A and 2B can be positioned at the bottom side 210b (FIGS. 2A and 2C) of the interposer 210 (and/or vice versa) in other embodiments. As another example, the channel circuits 220 and 320 can include a different arrangement of vias, can include signal transmission lines or other components that are embedded within the substrate of the interposer 210 (e.g., as opposed to positioned or exposed at the top side 210a and/or the bottom side 210b of the interposer), and/or can include additional signal transmission lines (e.g., stubs that can be optionally enabled) in addition to or in lieu of one or more signal transmission lines or other components of the channel circuits 220 and 320 shown in FIGS. 2A-3. As still another example, multiple layers can be positioned adjacent one another in the interposer 210 such that the interposer 210 includes a capacitance. The capacitance in the interposer 210 can be included in addition to or in lieu of one or more pairs of electrical contacts (e.g., the fourth pair 224, the seventh pair 227, and/or the ninth pair 229) of the channel circuit 220 and/or one or more circuit components (e.g., the first capacitor 324, the second capacitor 327, and/or the third capacitor 329) of the channel circuit 320. Additionally, or alternatively, electrical positions of electrical contacts can vary from what is illustrated in FIGS. 2A-3. For example, the first pair 221 of electrical contacts of FIGS. 2A and 2B can be electrically positioned in series (as opposed to in parallel) with the sixth pair 226 and/or the seventh pair 227 (FIGS. 2A and 2C) of electrical contacts in some embodiments.

A person of ordinary skill in the art will also readily appreciate that the resistance values, the capacitance values, and/or other properties of the channel circuit 320 of FIG. 3 can be altered and/or varied and still remain within the scope of the present technology. For example, circuit components 321-329 of other types and/or having other properties than illustrated in FIG. 3 can be selected and integrated into the channel circuit 320 based at least in part on their properties, their ability to generate ISI on the channel, and/or other desired effects on signals transmitted over the channel circuit 320. Thus, interposers having channel circuits configured in accordance with present technology offer a flexible way to quickly design channels with desired properties, including channels (a) that produce ISI requiring positive and/or negative DFE correction and/or (b) that produce ISI due to various combinations of causes (e.g., improper termination, such as from stubs in the channel, from on-die termination values that do not match the channel's impedance, from non-optimal drive impedances, and/or from impedance mismatches in packages, connectors, or vias; large capacitive loads in the channel; and/or dispersion effects where different frequencies are attenuated by different amounts). In addition, interposers having channel circuits configured in accordance with various embodiments of the present technology offer a way to quickly switch between various channel configurations, such as point-to-point, 1DPC, and/or 2DPC configurations. Additionally, or alternatively, the interposers (e.g., via sockets and/or corresponding electrical contacts) can be designed to work on multiple different tester platforms. In other words, interposers having channel circuits configured in accordance with various embodiments of the present technology facilitate quickly testing devices (e.g., memory devices with DFE circuitry) using channels with desired properties and configurations, with any one of multiple different testers, and at data speeds commonly employed in systems (e.g., memory systems) in which the devices can be incorporated.

FIG. 6 is a partially schematic partial top view of another interposer 610 configured in accordance with various embodiments of the present technology. In some embodiments, the interposer 610 can be the interposer 110 of FIG. 1, the interposer 210 of FIGS. 2A-2C, and/or another interposer of the present technology. As shown, the interposer 610 includes a channel circuit 620. The channel circuit 620 can include one or more channels configured to operably connect a DUT (e.g., the DUT 100 of FIG. 1) to another device (e.g., to the motherboard 150 of FIG. 1 and/or a tester). For example, the channel circuit 620 can operably include a channel extending from a second interface (not shown) of the interposer 610 at a bottom side (not shown) of the interposer 610, through a via (e.g., a PTH via or another type of via), and to a first interface 608 of the interposer 610 (e.g., via various signal transmission lines and/or circuit options, such as transmission lines 691, 692, 693, 694, and/or 695) at a top side or surface 610a of the interposer 610. The first interface 608 can be generally similar to the first interface 108 of FIG. 1 and/or the first interface 208 of FIGS. 2A and 2B. As such, the first interface 608 can include a socket that can facilitate reversibly, operably connecting (e.g., one or more pins or terminals of) a DUT to the channel circuit 620 of the interposer 610. In other embodiments, the first interface 608 can include electrical contacts at the top surface 610a of the interposer 610 (e.g., in addition to or in lieu of a socket) to which a DUT can be soldered or otherwise electrically coupled. Although not shown in FIG. 6, the interposer 610 can additionally include one or more other channels for electrically coupling a DUT to another device. For example, the interposer 610 can include one or more channels that extend directly from the top side 610a of the interposer 610 to the bottom side of the interposer 610 and/or that are designed for optimal signal integrity.

As shown in FIG. 6, the channel circuit 620 includes various circuit options that can be enabled to affect signals transmitted to or from a DUT over the channel circuit 620. For example, the channel circuit 620 can include a plurality of electrical contacts (e.g., pads, sockets, etc.) disposed in or on the top surface 610a of the interposer 610. The electrical contacts are arranged in eight pairs 681-688 in FIG. 6, with each pair configured to receive or to be electrically coupled (e.g., soldered) to a circuit component (e.g., a resistor, a capacitor, or another component) to complete an electrical connection across the corresponding electrical contacts and thereby enable a corresponding circuit option of the channel circuit 620. For example, the electrical contacts of each of the pairs 681-688 can be configured to receive a 0-ohm resistor, a wire link, a jumper, or another circuit component (e.g., a component having a different resistance or capacitance value).

The pairs 681-684 of electrical contacts of the channel circuit 620 can be used to electrically couple signal transmission line 692 and/or transmission line 693 to transmission lines 691 and 694. In some embodiments, the transmission line 692 can be a low pass channel option of the channel circuit 620, and/or the transmission line 693 can be a high pass channel option of the channel circuit 620. Thus, the pairs 681-684 of electrical contacts can be used to select which of the channel options (e.g., the low pass channel option or the high pass channel option) of the channel circuit 620 to enable. For example, in embodiments in which slower signal edge times are desirable, circuit components (e.g., 0-ohm resistors) can be used to electrically couple electrical contacts of the first pair 681 and the second pair 682 to one another such that (a) the transmission line 692 is electrically coupled to the transmission lines 691 and 694 and (b) a low pass channel of the channel circuit 620 is enabled. As another example, in embodiments in which faster data rates and/or faster edge times are desirable, circuit components (e.g., 0-ohm resistors or other circuit components) can be used to electrically couple electrical contacts of the third pair 683 and the fourth pair 684 to one another such that the transmission line 693 is electrically coupled to transmission lines 691 and 694 and such that a high pass channel of the channel circuit 620 is thereby enabled.

In these and other embodiments, the pairs 685-688 of electrical contacts of the channel circuit 620 can be used to electrically couple stubs 696-698 to the transmission lines 694 and 695. In other words, the pairs 685-688 of electrical contacts can be used to select which of the stubs 696-698 to enable. For example, a circuit component (e.g., a 0-ohm resistor or another circuit component) can be used to electrically couple electrical contacts of the fifth pair 685 to one another and thereby electrically couple the stub 696 to the transmission lines 694 and 695. Similarly, a circuit component (e.g., a 0-ohm resistor or another circuit component) can be used to electrically couple electrical contacts of the sixth pair 686 to one another and thereby electrically couple the stub 697 to the transmission lines 694 and 695. As shown in FIG. 6, the stubs 696 and 697 extend in different directions in or on the top side 610*a* of the interposer 610. Thus, the stub 696 can generate signal reflections on the channel circuit 620 in a first direction, and the stub 697 can generate signal reflections on the channel circuit in a second direction different from the first direction (e.g., generally perpendicular to and/or intersecting the first direction). Stated another way, the fifth pair 685 and sixth pair 686 of electrical contacts provide the ability to select a desired direction that reflections are generated on the channel circuit 620.

As still another example, a circuit component (e.g., a 0-ohm resistor or another circuit component) can be used to electrically couple electrical contacts of the seventh pair 687 to one another and thereby electrically couple a first portion 698*a* of the stub 698 to the transmission lines 694 and 695. Continuing with this example, another circuit component (e.g., a 0-ohm resistor or another circuit component) can be used to electrically couple electrical contacts of the eighth pair 688 to one another and thereby electrically couple a second portion 698*b* of the stub 698 to the first portion 698*a*. Thus, the seventh pair 687 of electrical contacts of the channel circuit 620 can be used to selectively couple the stub 698 to the transmission lines 694 and 695, and the eighth pair 688 of electrical contacts of the channel circuit 620 can be used to vary the length of the stub 698. In some embodiments, varying the length of a stub can alter reflections generated by the stub 698 and/or increase signal attenuation caused by the stub 698.

Therefore, selectively coupling corresponding electrical contacts of the pairs 681-688 of the channel circuit 620 to one another using circuit components can selectively enable corresponding circuit options of the channel circuit 620. In turn, this can selectively alter the properties of the corresponding channel of the channel circuit 220 that is configured to operably connect (e.g., a pin or terminal of) a DUT to another device (e.g., a motherboard or tester). In other words, based at least in part on (a) which of the pairs 681-688 include electrical contacts that are electrically coupled to one another via circuit components, and/or (b) the resistance, capacitance, or other properties of those circuit components, channel conditions of the channel circuit 620 can be customized, tailored, or altered to generate ISI and/or to achieve a desired effect on signals transmitted over the channel circuit 620. In some embodiments, the channel circuit 620 illustrated in FIG. 6 can be repeated across (e.g., the top side 610*a* of) the interposer 610, such as for operably connecting channel circuits to one or more other pins or terminals of a DUT. Thus, different channel circuits on the interposer 610 having the same or different properties and/or configurations as the channel circuit 620 of FIG. 6 can be used to test or characterize different DFE circuits operably connected to different pins or terminals of a DUT.

Although shown in FIG. 6 with eight pairs 681-688 of electrical contacts disposed in or on the top side 610*a* of the interposer 610 and electrically positioned at specific locations within the channel circuit 620, a person of ordinary skill in the art will readily appreciate that interposers having channel circuits with a different number of pairs of electrical contacts (e.g., less than or greater than eight pairs), different circuit options, different circuit option positionings or orientations, different circuit option channel configurations, and/or different channel properties than shown in FIG. 6 remain within the scope of the present technology. For example, one or more of the pairs 681-688 of electrical contacts and/or other pairs of electrical contacts of the channel circuit 620 can be disposed in or on the bottom side of the interposer 610. As another example, the channel circuit 620 can include a different arrangement of vias, stubs, and/or transmission lines; can include transmission lines, stubs, or other components that are embedded within the substrate of the interposer 610 (e.g., as opposed to positioned or exposed at the top side 610*a* and/or at the bottom side of the interposer 610); and/or can include additional circuit options (e.g., additional stubs, on-die termination values, I/O capacitance values, damping components, etc.) in addition to or in lieu of one or more of the stubs illustrated in FIG. 6. Additionally, or alternatively, the low pass channel option and/or the high pass channel option can be omitted in some embodiments.

Figure 7:
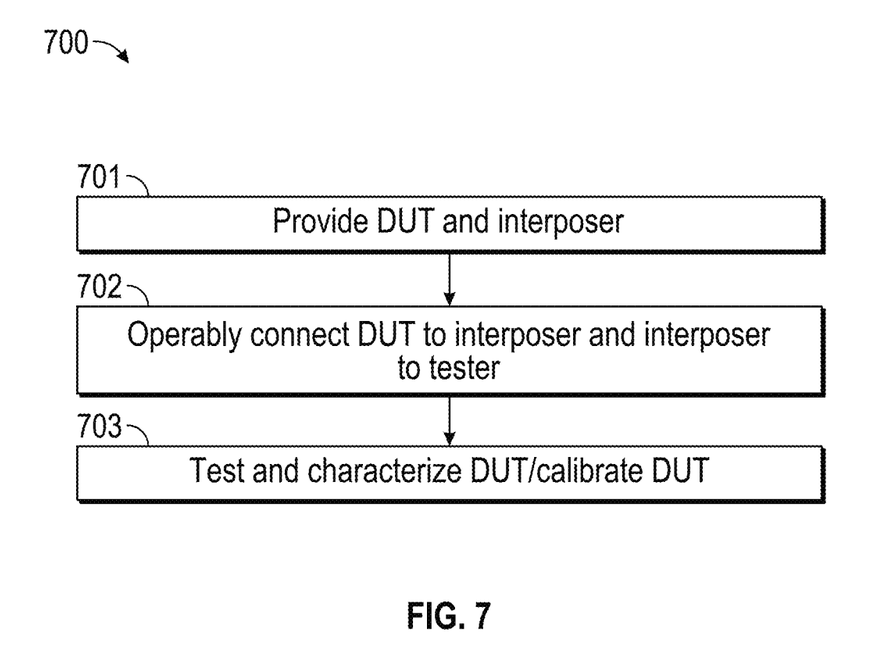
FIG. 7 is a flow diagram illustrating a method of testing or characterizing a memory device in accordance with various embodiments of the present technology.

FIG. 7 is a flow diagram illustrating a method 700 of testing or characterizing a DUT (e.g., the DUT 100 of FIGS. 1 and/or 2A; and/or the device represented by the resistor 311, the capacitor 312, and/or the receiver 362 in FIG. 3) in accordance with various embodiments of the present technology. The method 700 is illustrated as a set of steps or blocks 701-703. All or a subset of one or more of the blocks 701-703 can be executed by components or devices of a test and characterization system, such as the system 101 of FIG. 1. For example, all or a subset of one or more of the blocks 701-703 can be executed by (i) an interposer (e.g., the interposer 110 of FIG. 1, the interposer 210 of FIGS. 2A-2C, and/or the interposer 610 of FIG. 6) and/or one or more channel circuits (e.g., the channel circuit 220 of FIGS. 2A-2C, the channel circuit 320 of FIG. 3, and/or the channel circuit 620 of FIG. 6) of the interposer, (ii) a motherboard (e.g., the motherboard 150 of FIG. 1); (iii) the DUT (e.g., DFE circuitry of the DUT); (iv) a tester operably connected to the motherboard, the interposer, and/or the DUT; and/or (v) other components of the system (e.g., the eye probes 370*a* and/or 370*b* of FIG. 3). Furthermore, all or a subset of one or more of the blocks 701-703 can be executed by a user or operator of one or more components of the system. Moreover, any one or more of the blocks 701-703 can be executed in accordance with the discussion of FIGS. 1-6 above.

The method 700 begins at block 701 by providing a DUT and an interposer. In some embodiments, the DUT can be a memory device, such as a DDR5 memory device or another type of memory device. In these and other embodiments, the DUT can include DFE circuitry and/or other circuitry for testing and characterization using the interposer, the motherboard, and/or a tester operably connected to the motherboard.

In some embodiments, the interposer includes a channel circuit, such as the channel circuit 220 of FIGS. 2A-2C, the channel circuit 320 of FIG. 3, the channel circuit 620 of FIG. 6, and/or another channel circuit configured in accordance with various embodiments of the present technology. The channel circuit can include various circuit options that can be selectively enabled, for example, using one or more circuit components. The circuit options can include stubs, on-die termination values, I/O capacitance values, damping components, 1DPC configurations, 2DPC configurations, low pass channel options, high pass channel options, and/or other circuit options that, when enabled, can affect signals transmitted over the channel circuit.

At block 702, the method 700 continues by operably connecting (a) the DUT to a first interface of the interposer and (b) a second interface of the interposer to a tester. In some embodiments, the DUT can be reversibly or temporarily operably connected to the interposer via a socket or other electrical contacts of the first interface of the interposer. In these and other embodiments, the second interface of the interposer can be reversibly or temporarily operably connected to the motherboard via a socket or other electrical contacts. In other embodiments, the DUT can be soldered to the first interface of the interposer, and/or the second interface of the interposer can be soldered to a motherboard operably connected to the tester. Operably connecting the DUT to the first interface of the interposer and the second interface of the interposer to the motherboard/tester can occur in any order. When the DUT is operably connected to the first interface of the interposer and the second interface of the interposer is operably connected to the motherboard/tester, the DUT can be operably connected to the motherboard/tester via one or more channel circuits of the interposer. Stated another way, the channel circuit can couple the first interface to the second interface.

At block 703, the method 700 continues by testing and characterizing the DUT. In some embodiments, testing and characterizing the DUT includes transmitting a signal to the DUT from the tester. In these and other embodiments testing and characterizing the DUT includes transmitting a signal to the tester from the DUT. In these and still other embodiments, testing and characterizing the DUT includes testing or characterizing circuitry and/or operations of the DUT. For example, testing or characterizing the DUT can include testing or characterizing DFE circuitry of the DUT, such as by monitoring the ability of the DFE circuitry to mitigate, reduce, or cancel the effect of ISI on signals transmitted to the DUT over the channel circuit of the interposer.

Although the blocks 701-703 of the method 700 are discussed and illustrated in a particular order, the method 700 illustrated in FIG. 7 is not so limited. In other embodiments, the method 700 can be performed in a different order. In these and other embodiments, any of the block 701-703 of the method 700 can be performed before, during, and/or after any of the other blocks 701-703 of the method 700. Moreover, a person of ordinary skill in the relevant art will recognize that the illustrated method 700 can be altered and still remain within these and other embodiments of the present technology. For example, one or more blocks 701-703 of the method 700 illustrated in FIG. 7 can be omitted and/or repeated in some embodiments. As another example, the method 700 can include additional blocks than shown in FIG. 7. As specific examples, the method 700 can include additional blocks in other embodiments directed to (a) operably disconnecting the second interface of the interposer from the tester, operably disconnecting the DUT from the first interface of the interposer, and/or operably disconnecting the DUT from the motherboard/tester, (b) swapping the interposer out for a different interposer (e.g., having different channel properties or configurations), (c) incorporating the DUT into an end system (e.g., incorporating a memory device DUT into a memory system after testing and characterization of the memory device confirms that the memory device is functioning as intended), (d) rejecting the DUT (e.g., after testing and characterization of the DUT indicated that the DUT is not functioning as intended), and/or (e) swapping the DUT out for a different (e.g., a next) DUT for testing and characterization.

As used herein, the terms "memory system" and "memory device" refer to systems and devices configured to temporarily and/or permanently store information related to various electronic devices. Accordingly, the term "memory device" can refer to a single memory die and/or to a memory package containing one or more memory dies. Similarly, the term "memory system" can refer to a system including one or more memory dies (e.g., a memory package) and/or to a system (e.g., a dual in-line memory module (DIMM)) including one or more memory packages.

Where the context permits, singular or plural terms can also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having" and "with" are used throughout to mean including at least the recited feature(s) such that any greater number of the same feature and/or additional types of other features are not precluded. Moreover, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." Moreover, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B. In addition, the terms "connect" and "couple" can, depending on context, refer to a relationship between two or more objects including (a) a mechanical relationship between the two or more objects (e.g., A is mechanically or physically coupled to B), (b) an electrical relationship between the two or more objects (e.g., A is electrically coupled to B, such as via a transfer of electrical energy between A and B), (c) a communicative relationship between the two or more objects (e.g., A is communicatively coupled to B such that A can communicate with B and/or B can communicate with A, for example, wirelessly or over a wire), and/or (d) an operative relationship between the two or more objects (e.g., operation of A can involve an interaction with B and/or vice versa).

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented and/or discussed in a given order, alternative embodiments can perform steps in a different order. Furthermore, the various embodiments described herein can also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. From the foregoing, it will also be appreciated that various modifications can be made without deviating from the technology. For example, various components of the technology can be further divided into subcomponents, or that various components and functions of the technology can be combined and/or integrated. Furthermore, although advantages associated with certain embodiments of the technology have been described in the context of those embodiments, other embodiments can also exhibit such advantages, and not all embodiments need necessarily exhibit such advantages to fall within the scope of the technology. Accordingly, the disclosure and associated technology can encompass other embodiments not expressly shown or described herein.

What is claimed is:

1. An apparatus, comprising:
    an interposer comprising:
        a first interface couplable to a memory device,
        a second interface couplable to one or more testers, and
        a channel circuit between the first interface and the second interface, the channel circuit configurable, via one or more resistive elements, to change a measurable value of a signal transmitted between the first interface and the second interface via the channel circuit.

2. The apparatus of claim 1, wherein:
    the channel circuit includes a pair of electrical contacts; and
    the pair of electrical contacts is configured to receive a resistive element of the one or more resistive elements such that electrical contacts of the pair are coupled to one another.

3. The apparatus of claim 1, wherein the one or more resistive elements includes a resistor configured to function as a damping resistor at least when (a) the resistor is coupled to the first interface and the second interface of the interposer and (b) the signal is transmitted between the first interface and the second interface via the channel circuit.

4. The apparatus of claim 1, wherein the one or more resistive elements includes a resistor configured to simulate an on-die termination value of an additional memory device connected to the channel circuit at least when (a) the resistor is coupled to the first interface aid the second interface of the interposer and (b) the signal is transmitted between the first interface and the second interface via the channel circuit.

5. The apparatus of claim 1, wherein the one or more resistive elements includes a capacitor configured to simulate an input/output (I/O) capacitance of an additional memory device connected to the channel circuit at least when (a) the capacitor is coupled to the first interface and the second interface of the interposer and (b) the signal is transmitted between the first interface and the second interface via the channel circuit.

6. The apparatus of claim 1, wherein:
    the channel circuit includes a stub; and
    the stub is configured to generate reflections on the channel circuit at least when (a) the stub is coupled, via a resistive element of the one or more resistive elements, to the first interface and the second interface and (b) the signal is transmitted between the first interface and the second interface via the channel circuit.

7. The apparatus of claim 1, wherein:
    the channel circuit includes a stub having a first portion and a second portion;
    the second portion is couplable to the first portion via a resistive element of the one or more resistive elements to increase a length of an operable portion of the stub; and
    the operable portion of the stub is configured to generate reflections on the channel circuit at least when (a) the operable portion of the stub is coupled to the first interface and the second interface and (b) the signal is transmitted between the first interface and the second interface via the channel circuit.

8. The apparatus of claim 1, wherein:
    the channel circuit includes a first stub and a second stub;
    the first stub extends in a first direction along the interposer;
    the second stub extends in a second direction along the interposer different from the first direction;
    the first stub is configured to generate reflections on the channel circuit along the first direction at least when (a) the first stub is coupled, via a first resistive element of the one or more resistive elements, to the first interface and the second interface and (b) the signal is transmitted between die first interface and the second interface via the channel circuit; and
    the second stub is configured to generate reflections on the channel circuit along the second direction at least when (a) the second stub is coupled, via a second resistive element of the one or more resistive elements, to the first interface and the second interface and (b) the signal is transmitted between the first interface and the second interface via the channel circuit.

9. The apparatus of claim 1, wherein,
the channel circuit includes a low pass channel and a high pass channel;
the signal is transmitted, via the low pass channel, between the first interface and the second interface at least when the first interface and the second interface are coupled to one another via a first resistive element of the one or more resistive elements and the low pass channel; and
the signal is transmitted, via the high pass channel, between the first interface and the second interface at least when the first interface and the second interface are coupled to one another via a second resistive element of the one or more resistive elements and the high pass channel.

10. The apparatus of claim 1, wherein the channel circuit includes a first circuit portion configured to simulate an additional memory device connected to the channel circuit at least when (a) the first circuit portion is coupled, via a resistive element of the one or more resistive elements, to the first interface and the second interface and (b) the signal is transmitted between the first interface and the second interface via the channel circuit.

11. The apparatus of claim 10, wherein the first circuit portion simulates a clamshell arrangement of a dual in-line memory module (DIMM) and is positioned, at least in part, in or on a side of the interposer opposite the memory device at least when the memory device is coupled to the fust interface.

12. The apparatus of claim 10, wherein the channel circuit further includes a second circuit portion different from the fast circuit portion, wherein the second circuit portion is configured to simulate multiple additional memory devices connected to the channel circuit at least when (a) the second circuit portion is coupled, via a second resistive element of the one or more resistive elements, to the first interface and the second interface and (b) the signal is transmitted between the first interface and the second interface via the channel circuit.

13. The apparatus of claim 12, wherein the second circuit portion simulates a clamshell arrangement of a dual in-line memory module (DIMM) and is positioned, at least in part, in or on (a) a first side of the interposer and (b) a second side of the interposer opposite the first side.

14. The apparatus of claim 1, wherein the first interface includes a socket configured to receive and couple the memory device to the channel circuit.

15. The apparatus of claim 1, wherein, to change the measurable value of the signal, the channel circuit is configurable, via the one or more resistive elements, to generate inter-symbol interference (ISI) at the first interface for testing decision feedback equalization (DFE) circuitry of the memory device at least when the memory device is coupled to the first interface.

16. A system, comprising:
a motherboard coupled to a tester for testing or characterizing a memory device; and
an interposer including a first interface coupled to the memory device, a second inter face coupled to the motherboard, and a channel circuit coupling the first interface to the second interface such that the memory device is coupled to the tester via the motherboard,
wherein the channel circuit is configurable, via one or more resistive elements, to alter a measurable value of a signal transmitted between the tester and the memory device.

17. The system of claim 16, wherein:
the channel circuit includes at least one pair of electrical contacts configured to receive a resistive element of the one or more resistive elements such that electrical contacts of the pair are coupled to one another; and
at least when (a) the electrical contacts of the pair are coupled to one another and (b) the resistive element is coupled to the first interface and the second interface, the channel circuit is configured to generate inter-symbol interference (ISI) at the first interface to alter the measurable value of the signal.

18. The system of claim 17, wherein:
(a) an electrical contact of the pair is coupled to a stub of the channel circuit that is configured to generate reflections on the channel circuit at least when the electrical contacts of the pair are coupled to one another via the resistive element and the signal is transmitted between the tester and the memory device via the channel circuit;
(b) the resistive element includes a resistor that simulates an on-die termination value of a second memory device connected to the channel circuit at least when the resistor couples the electrical contacts of the pair to one another and the signal is transmitted between the tester and the memory device via the channel circuit;
(c) the resistive element includes a capacitor that simulates an input/output (I/O) capacitance of a third memory device connected to the channel circuit at least when the capacitor couples the electrical contacts of the pair to one another and the signal is transmitted between the tester and the memory device via the channel circuit; or
(d) any combination thereof.

19. A substrate, comprising:
a first interface couplable to a memory device;
a second interface couplable to a tester; and
a channel circuit between the first interface and the second interface, wherein the channel circuit is configurable, via one or more resistive elements, to generate inter-symbol interference (ISI) at the fust interface to change a measurable value of a signal transmitted between the first interface and the second interface via the channel circuit.

20. The substrate of claim 19, wherein the channel circuit comprises one or more pairs of electrical contacts, each pair configured to receive a resistive element of the one or more resistive elements to couple electrical contacts of the pair to one another and contribute, at least part, to generation of the ISI at the first interface at least when (a) the electrical contacts of the pair are coupled to the first and second interfaces and (b) the signal is transmitted between the first interface and the second interface.

* * * * *